United States Patent [19]

Engel

[11] Patent Number: 5,124,984
[45] Date of Patent: Jun. 23, 1992

[54] ACCESS CONTROLLER FOR LOCAL AREA NETWORK

[75] Inventor: Ferdinand Engel, Northborough, Mass.

[73] Assignee: Concord Communications, Inc., Marlborough, Mass.

[21] Appl. No.: 564,026

[22] Filed: Aug. 7, 1990

[51] Int. Cl.⁵ .......................... H04J 3/24; G06F 7/04
[52] U.S. Cl. ............................. 370/94.1; 340/825.31; 370/85.3; 370/85.4
[58] Field of Search ................. 370/85.1, 85.3, 92, 370/93, 94.1, 85.4, 85.5; 340/825.06, 825.31, 825.34; 379/35, 91, 95

[56] References Cited

U.S. PATENT DOCUMENTS

| 4,413,258 | 11/1983 | Quick, Jr. et al. | 340/825.5 |
| 4,580,872 | 4/1986 | Bhatt et al. | 350/96.16 |
| 4,799,153 | 1/1989 | Hann et al. | 340/825.34 |
| 4,891,639 | 1/1990 | Nakmura | 340/825.06 |
| 4,896,319 | 1/1990 | Lidinsky et al. | 370/94.1 |
| 4,897,874 | 1/1990 | Lidinsky et al. | 370/94.1 |
| 4,930,159 | 5/1990 | Kravitz et al. | 370/94.1 |
| 4,962,449 | 10/1990 | Schlesinger | 340/825.34 |

FOREIGN PATENT DOCUMENTS 3904403 8/1989 Fed. Rep. of Germany .

OTHER PUBLICATIONS

"Security in a LAN Environment Requires Controls that Deny Unauthorized Access to Information", Sobol, M., pp. 36 and 37.

Primary Examiner—Douglas W. Olms
Assistant Examiner—H. Kizou
Attorney, Agent, or Firm—Cesari & McKenna

[57] ABSTRACT

An access controller for peer-to-peer communication networks which monitors the data packets transmitted between stations, determines when an access that needs to be controlled is being made, and then either destroys the packet or transmits one or more packets which appear as legitimate message packets to the stations but which, in fact, terminates or alters the communication path between the two stations. Since the invention is free of any particular protocol restrictions, it can be implemented with any type of protocol and at any layer of that protocol. And since the access control mechanism is neither part of the physical communication path nor part of the communication primitives, the stations cannot detect, in any direct sense, that their access is being controlled, and they do not need to be programmed to follow any special control protocols, or to use encryption. A signature signal can be used as a safety mechanism to prevent multiple access controllers from controlling the same network, to prevent an unauthorized access controller from seizing control of the network.

41 Claims, 4 Drawing Sheets

ACCESS CONTROLLER FOR LOCAL AREA NETWORK

FIELD OF THE INVENTION

This invention relates generally to communication networks and particularly to an access controller which eliminates the need for network stations to implement security protocols.

BACKGROUND OF THE INVENTION

Peer-to-peer communication systems, such as local area networks (LANs), have become the technique of choice for connecting many computer devices, or stations, together. The basic architecture of a LAN allows multiple stations to vie for access, on an equal basis, to a physical media of a moderately high bandwidth. A key feature of the most popular LAN access methods, such as Carrier Sense Multiple Access with Collision Detection (CSMA/CD), Token-Passing Ring, and Token-Passing Bus, is that they do not require a central communication controller. The net result is a system which allows interconnecting a large number of stations simply, quickly, and without the need to purchase expensive interface hardware for each station.

Thus, the very power of a LAN lies in its ease of access to a shared media. However, simplicity of access to a shared media means that LANs have some well known security problems, including privacy and unauthorized access.

Privacy is a problem since every station can usually read every data packet transmitted. Thus, with the standard arrangement, there is no way to prevent an unauthorized user from connecting to the LAN and reading sensitive information.

Since any station can also obtain control of the media, and begin transmitting data messages, or packets, controlling unauthorized write access is also a problem, for several reasons.

First, an unauthorized user can seriously disrupt the orderly sharing of the LAN, simply by repeatedly transmitting packets, either intentionally or unintentionally.

Second, there are no built-in controls to limit access of stations with each other or with various LAN services, such as printers or disk drives. The net result is that there is no standardized way to prevent an authorized user from monopolizing shared resources.

Third, there is no mechanism for distributing the packet traffic in any controlled manner. In other words, because LANs inherently allow every station equal access, they also do not inherently afford any mechanism which allows some users a greater or lesser amount of service.

Conventional solutions to such LAN access control problems include encryption, operating system controls, and physical isolation.

Encryption has been the most popular LAN security solution. Encryption mechanisms have many different attributes, but generally fall into two categories. First, they are implemented such that network stations must participate, by having the required encryption hardware to provide a secure physical connection path from station to station. Alternately, encryption can be implemented as part of a communication protocol used by the stations. In this case, the actual data packets include encrypted primitives.

Another technique is to require the stations to follow some sort of security protocol. However, this has the disadvantage of requiring each station to be reprogrammed; the lack of widely accepted security protocols makes this approach cumbersome to implement.

Network operating system software, such as NetWare products marketed by Novelle, and the LAN Manager products marketed by Microsoft Corporation, can also limit access to the various network services they support. Such systems thus do provide control over particular network peripherals such as printers and disk drives, but they do not provide control over devices which they do not support. In addition, these systems do not provide any fundamental control over the access to the media itself.

Yet another solution is to physically isolate the stations, which of course, prevents any packet traffic between them. Communications between two or more LANs can then be enabled on a controlled basis, by employing interconnection devices such as routers or bridges. However, stations on the same LAN will still have complete access to one another, and thus, this approach only partially solves the difficulty. Additionally, the use of bridges and routers unnecessarily complicates the physical configuration of the network.

What is needed is a way to provide access control within a peer-to-peer communication network without the use of encryption, active participation in security protocols, operating systems, or physical isolation. The technique should not require participation by the network stations; in fact, it should be invisible to them. The technique should also not require reconfiguration of the network, and should be simple and inexpensive to implement. It is also desirable to accomplish this in such a way that the unauthorized users do not know they are being controlled.

SUMMARY OF THE INVENTION

The invention is a network access controller which monitors the packet traffic between stations, determines when an improper type of access is being made, and then either destroys the packet or transmits one or more packets which appear a legitimate response to all network stations, but which, in fact, cause the termination or alteration of the communication path between two or more stations.

The invention provides a mechanism for limiting access to a network without the need for the stations to implement an access control protocol. It also provides control of any and all stations, regardless of their type. Because of this, it is compatible with any type of protocol, and at any layer of that protocol. Any network protocol is a candidate for this type of access control, as long as it has some sort of mechanism which terminates communications between two stations. The invention makes use of these mechanisms, by acting as an invisible third party. If this termination occurs early enough in the connection process, it can severely limit the ability of the party being controlled to access network resources.

Additionally, since the access controller is neither part of the physical path, nor part of the protocol primitives, the end users do not know, in any direct sense, that their access is being limited.

The invention can also provide a safety mechanism, in the nature of a signature signal, to prevent multiple access controllers from attempting to control the same network, or to prevent the network from being seized by an unauthorized access controller.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
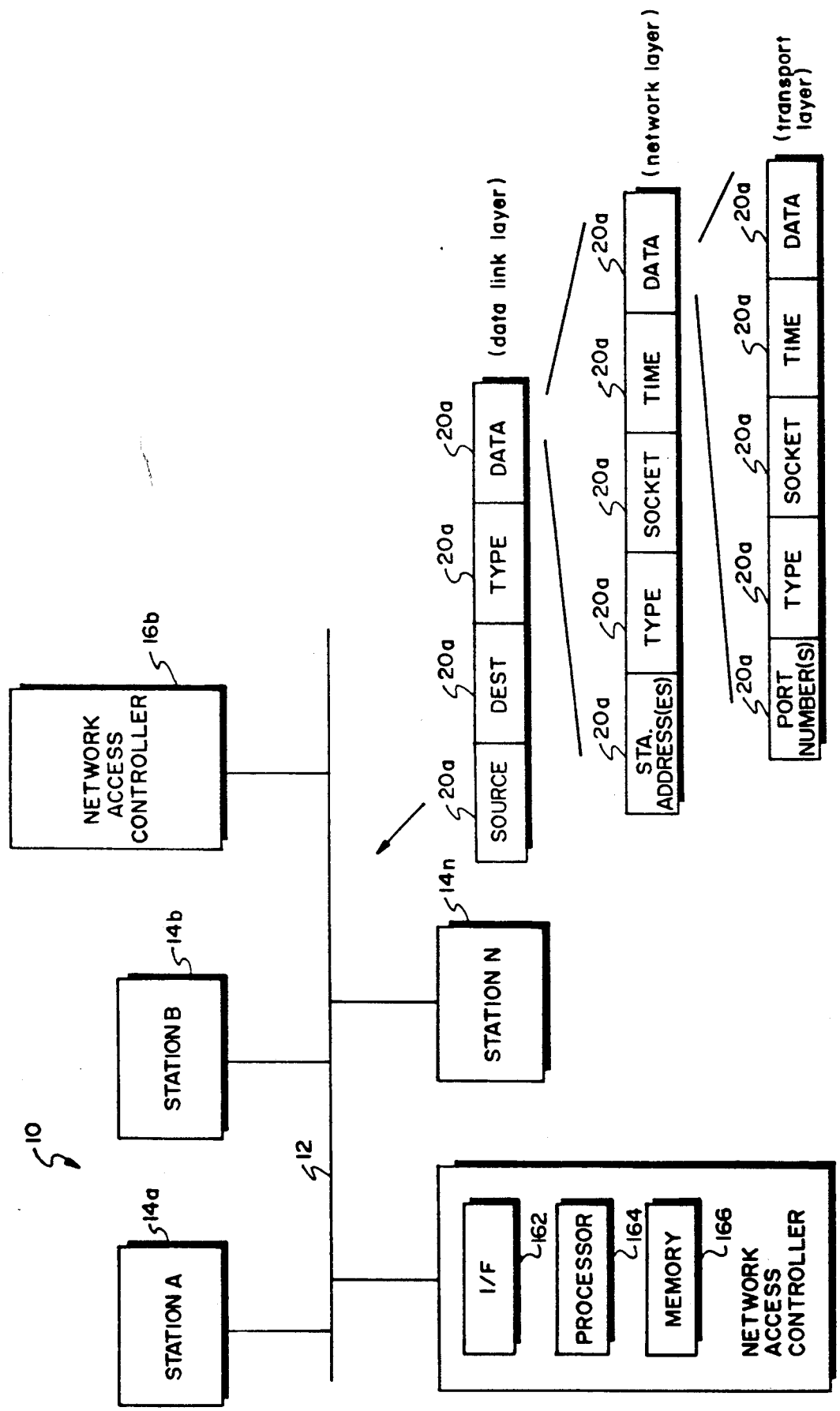
FIG. 1 is a block diagram of a Local Area Network (LAN) including a network access controller according to the invention.

Turning to the drawings more particularly, FIG. 1 shows a local area network (LAN) 10 including a network medium 12, a number of stations 14a, 14b, ... and 14n (collectively, stations 14), and a network access controller 16a. As will be understood shortly, the network access controller 16a limits access to the network 10 by unauthorized stations 14, without requiring security schemes to be deployed by each station 14. in addition, the network access controller may further limit attempts to control the network 10 by an unauthorized network access controller 16b.

The medium 12 represents the physical communication path between the stations 14. There is no restriction as to the type of path, as long as the access controller 16a is also able to read transmitted data packets and is also able to transmit packets to the stations 14. While the illustrated medium 12 resembles a local area bus or ring, this should not in any way be interpreted as a limitation on the invention being described.

The stations 14 may be any computer equipment capable of sending or receiving information over the medium 12. The stations 14 can be data terminals, mainframes, PCs, servers for printers, disks, and other shared devices, or bridges to other networks.

The access controller 16a is a computer programmed to act as a third party which manipulates the available network control mechanisms to control the connections between stations 14. In particular, it listens to all packets, or messages, transmitted over the medium 12. Whenever it sees an attempt to transmit between two stations, such as a packet transmitted from station 14a to station 14b, it determines if the packet is of an authorized type. If the communication is not authorized, it exercises the appropriate control mechanisms to discontinue such communications between stations 14a and 14b.

The access controller 16a is not in any manner involved in providing a communication path from station 14a to station 14b. Rather, it is a third party to the communications between 14a and 14b, and operates independently therefrom. It does this by passively detecting transmitted packets on the medium 12 and determining if they are allowed to occur according to access control policy information stored within the access controller. If the attempted access is allowable, then the access controller 16a does nothing. If the packet being transmitted is not allowed, then the access controller 16a prevents successive transmissions of the same type, by manipulating one or more existing mechanisms within the communication protocols used by the stations 14.

Unlike traditional approaches, then, the invention requires no cooperation by each station 14; that is, it does not use passwords, keys, or other special security protocol mechanisms for allowing the stations 14 to connect to the medium 12. Rather, it watches the behavior of the stations, and allows continuing access based solely upon that behavior being legitimate. The access controller 16a does not normally participate in message traffic, and only intervenes when an unallowed type of access is being attempted.

The access controller 16a operates with various types of protocols, and at various particular protocol layers. The use of the term "layer" refers, in general, to the Open System Interconnect (OSI) style of layered protocols. While the OSI model is a convenient methodology for discussing protocols, it does not imply that the access controller works only with on OSI or OSI-like protocols. The only restriction is that the protocol layer being used has certain terminating mechanisms which allow the communication between two stations to come to an end.

In some cases, depending on the protocol layer and type, some information may flow between station 14a and station 14b. However the protocol exchange rules can usually be used to prevent completion of a packet, thereby making full access between two stations 14 impossible.

Now more particularly, the access controller 16a hardware typically includes a physical network interface 162, a processor 164, and a memory 166. However, other embodiments of controller 16a are possible.

Figure 2:
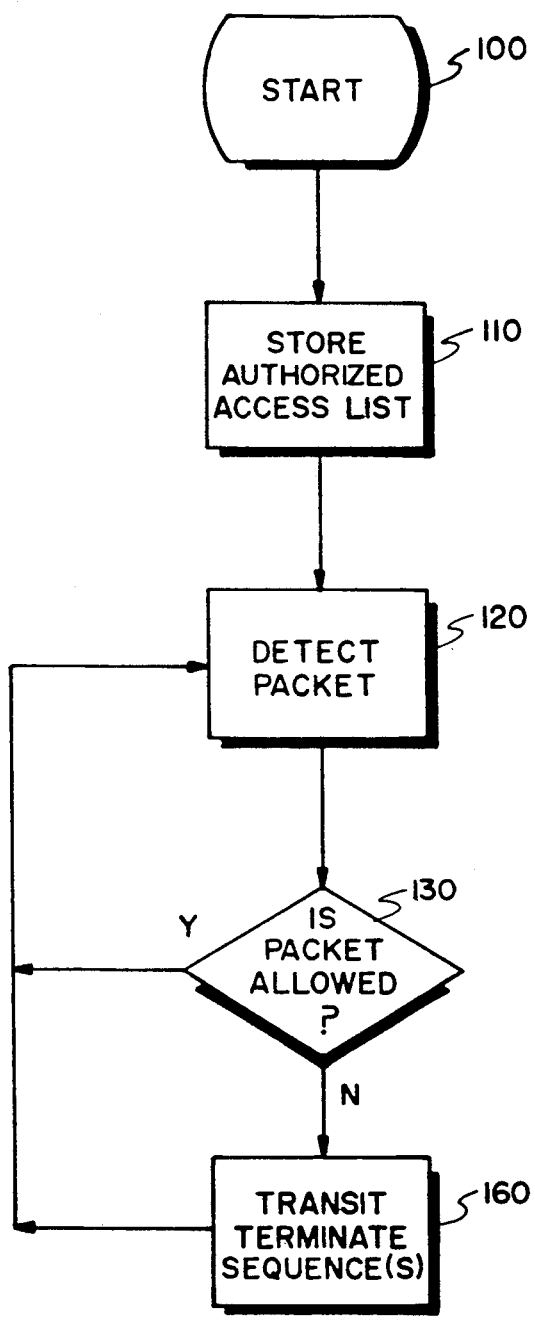
FIG. 2 is a flowchart of the operations performed by the access controller to prevent unauthorized access.

FIG. 2 is a flowchart of the sequence of operations performed by the processor 164. An initialization step 100 is followed by a step 110 in which the processor 164 stores a list of authorized access types in the memory 166, typically under instruction from a system manager (not shown).

In step 120, the interface 162 monitors the medium 12 and provides packet information to the processor 164. In step 130, the processor 164 examines and compares each received packet to the list of allowable packet types stored in the memory 166. If the packet is one of the allowed types, then control returns to step 120.

However, if the packet indicates an unauthorized attempt to communicate, then control passes to step 160, where the processor 164 instructs the interface 162 to transmit one or more control sequences over the medium 12 to terminate the undesired communication.

The access controller 16a may exercise the different types of controls available to it, and these controls may be exercised at different protocol layers. For example, if the access controller 16a is requested to prevent station 14a from ever using the network 10, it may achieve that result with mechanisms in the data link layer. If the access controller 16a is requested to prevent station 14a from using a particular disk on station 14b, it could accomplish this control with a mechanism in the transport layer protocol.

While the format of the packets of interest transmitted on the network 10 depends upon the exact type of physical medium 12, and the layer of the protocol at which the invention is implemented, an exemplary packet 20 is shown in FIG. 1. Such a packet includes a source field 20a, a destination field 20b, a type field 20c, and a data field 20d. The source field 20a generally indicates an identifier, such as the network address, of the station 14a which originates the packet. Similarly, the destination field 20b indicates an identifier for the station 14b intended to receive the packet. The type field 20c indicates the type of packet, in accordance with the rules of the protocol in use, and finally, the data field 20d contains data to be sent to the destination station 14b. The data field 20d may itself include additional protocol information for higher protocol layers.

Although the network access control sequence in the case of a token ring network actually takes the form of a packet, in other physical layer embodiments of the invention, such as in CSMA/CD type systems, the control sequence need not be a complete packet (i.e., having a destination and source address and type field, etc.), but may simply be a signal having the proper timing to cause a "collision", that is, a situation in which two stations 14 attempt to transmit at the same time.

Furthermore, while the foregoing description has assumed that the access controller 16a always interrupts communications between stations 14a and 14b, and thus prevents all communication between them, the same technique can also be used to provide load balancing, such as by allowing access to occur only at authorized times, for example, when a network service such as a printer located at 14b is not otherwise busy.

While the access controller 16a can adequately control access between the stations 14, by following the simple procedure of FIG. 2, there is nothing to prevent anarchy from occurring in the LAN environment. In particular, an unauthorized user at station 14b could install a rogue access controller 16b and being exercising unauthorized control over the network 10. The access controller 16a thus preferably has additional safeguards to prevent unauthorized controller 16b from gaining access to the network 10.

The preferred mechanism for accomplishing this, is to have the access controller 16a transmit a signature signal whenever it performs a terminate sequence or similar access control. An access controller identification (ID) field is included as part of the signature signal.

The signature signal provides every access controller on the network 10 with the ability to identify the existence of other access controllers, and to take proper action when such an event occurs. This enables the authorized access controller 16a to determine the ID numbers off the rogue access controller 16b through software provided by the manufacturer of the access controllers 16. The human network manager can then determine the name and address of the individual who purchased the rogue access controller 16b, and take appropriate steps.

Transmitting an access controller signature is only the first step in providing a complete safeguard. The second step is to have the access controller 16a discontinue its operation when it determines that another access controller 16b also connected to the same network 10 for a period of time. This solves the problem of more than one access controller trying to control a particular network 10.

Unfortunately, this shutting down may also allow the rogue access controller 16b to seize control of the network 10. To solve this difficulty, each access controller 16a, 16b also transmits a shutdown signal of its own before shutting down in response to receiving a signature signal from another access controller. This, in turn, allows every other access controller 16 connected to the network 10 to determine that multiple access controllers 16 exist. As a result, the shutdown signal renders all access controllers inoperative for a predetermined period of time.

Figure 3:
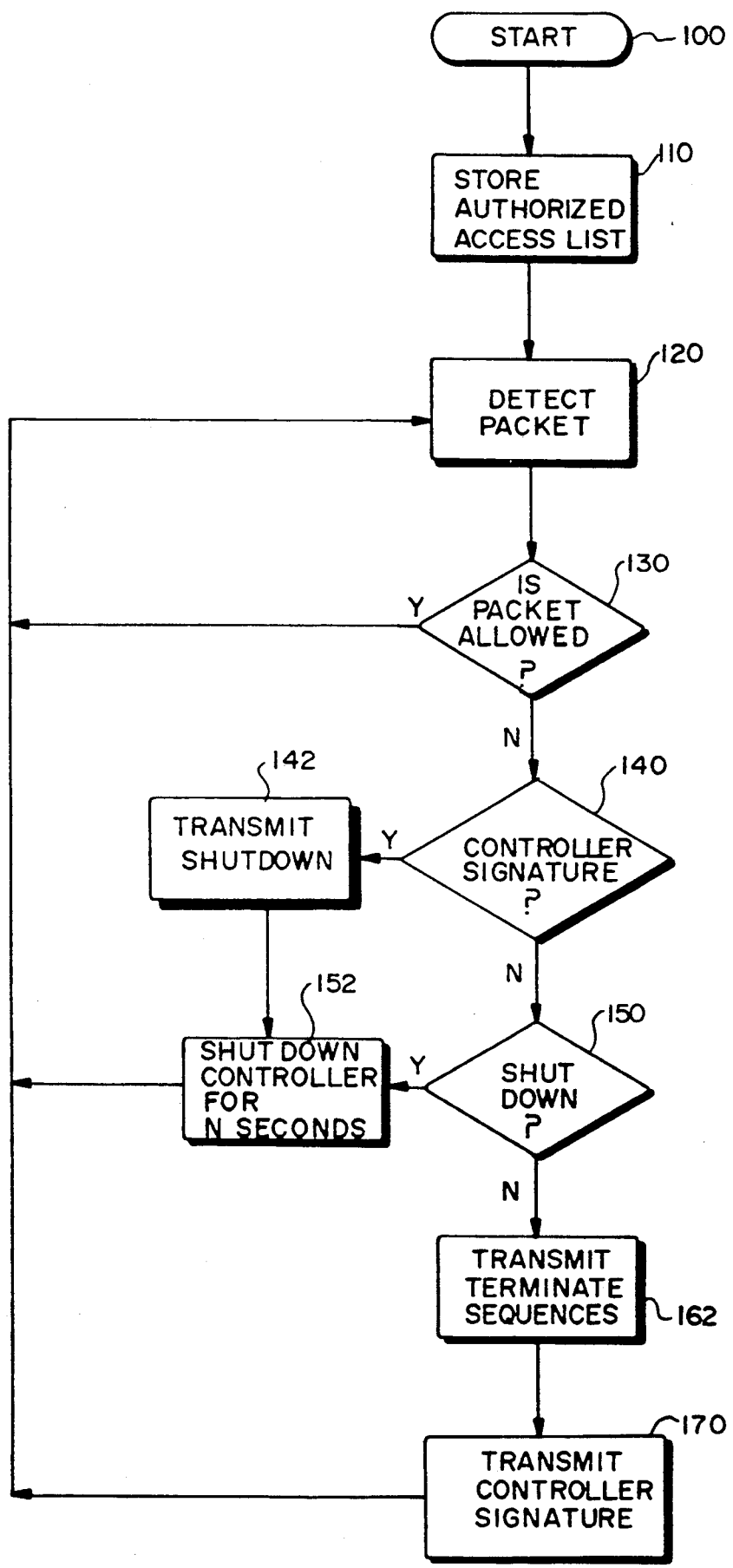
FIG. 3 is a flowchart of the operations performed to prevent an unauthorized controller from seizing control of the network.

FIG. 3 is a flowchart of the additional operations necessary for the access controller 16a to perform this security function. From step 130 (FIG. 1), the processor 164 next determines if the unusual packet is a controller signature. If so, then another access controller 16b must be present, and a shutdown signal is transmitted in step 142. Next, in step 152, the controller shuts itself down for a predetermined period of time.

If however, a shutdown signal is received in step 150, the processor 164 simply shuts itself down, as in step 152.

Otherwise, the packet received must be an unauthorized attempt to communicate, and in step 162 the termination sequences are transmitted. In step 170, a controller signature signal is also sent to inform other controller 16b of controller 16a's shut down action.

The additional processes depicted in FIG. 3 thus solve the following scenario. Rogue access controller 16b connects to the medium 12 and starts controlling the stations 14. A legitimate access controller 16a then shuts down because it senses the presence of another access controller. Before shutting down, however, it transmits a shutdown signal of its own. This, in turn, is received by controller 16b, causing it to shut itself down, leaving no access controller 16 active on the network 10, for at least a predetermined period of time.

The following discussion details specific examples of how the invention may be embodied at various layers of a communication protocol, such as the data link layer, the network layer and the transport layer.

Data Link Layer

Referring again to FIG. 1, the data link layer provides a basic mechanism for sending information between station 14a and station 14b. In general, a data link layer will have a mechanism for determining if the tranmission between station 14a and station 14b has occurred or needs to be retried—this is the preferred mechanism for disrupting communications. Assuming station 14a is transmitting and station 14b is receiving, the access controller 16a can either prevent station 14a from completing the transmission, or it can prevent station 14b from receiving the complete transmission.

The method of determining whether to terminate the transmission can be based on any of the data bits inside the packet 20. For example, the access controller 16a can make its decision based upon the contents of the source field 20a, destination field 20b, or protocol type field 20c, as well as network addresses or transport and higher layer service requests contained in the data field 20d. Stated another way, any logical test can be used to evaluate any of the bits in the packet 20 to determine its eligibility for transmission. The primary limitation is the amount of time available to determine the status of the packet 20 and the timing necessary to exercise the communication transaction mechanisms.

Figure 4:
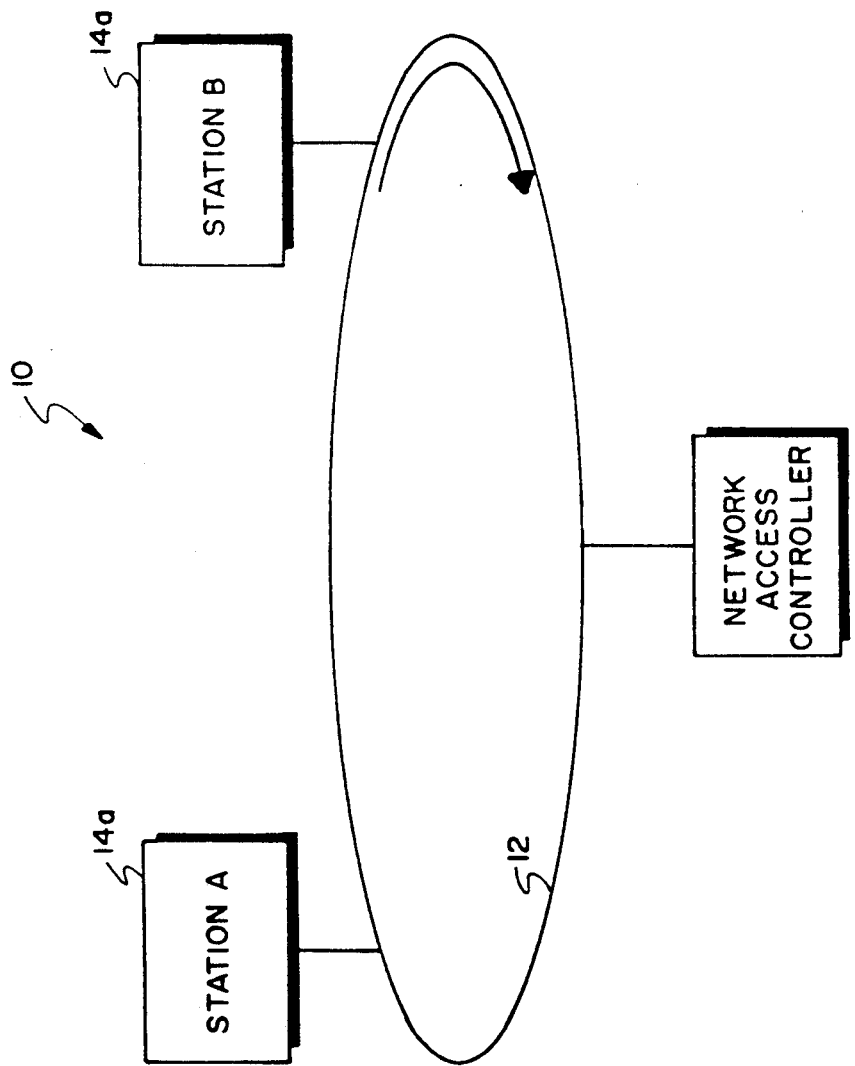
FIG. 4 depicts the logical arrangement of stations and the access controller in a token-passing network.

As a specific example, consider how the invention can be implemented with a data link layer which uses the IEEE 802.5 Token Ring protocol. The Token Ring does not use a bus architecture, and therefore the access controller 16a behaves differently depending upon which side of the communicating station 14a it is located. For example, assume that the tokens are travelling clockwise around the ring medium 12, as indicated by the arrow in FIG. 4. The affect of the access controller 16a will be different, depending on whether station 14a is to be prevented from communicating with station 14b, or whether station 14b is to be prevented from communicating with station 14a.

In the first instance, the access controller 16a cannot detect the packet transmitted by station 14b until after it has been received by station 14b. However, since in the 802.5 protocol, packets continue around the ring until returned to their source, as a verification proceeding the access controller 16a can simply destroy the packet. This will cause station 14a to believe that station 14b did not receive the packet. After a retransmission attempt, station 14a will eventually cease communication, since it has been led to presume that station 14b is not reachable. While it is clear that some information is flowing from station 14a to station 14b in this scenario, and thus the path from station 14a to station 14b is not secure (in the military sense), it does prevent normal two-party communications, and is therefore an effective control mechanism.

In the later case, where station 14b is to be prevented from communicating with station 14a, the access controller 16a is able to destroy the packet before station 14a even sees it. Station 14b will thus re-transmit, and eventually cease communication with 14a, concluding that station 14a is not reachable.

Those of skill in the art will recognize that the concept can be implemented quite easily with other types of data link protocols.

Network Layer

The network layer is typically responsible for forwarding packets between various computer networks to allow for transparent or "seamless" communication between LANs. The basic concept in implementing the invention at the network layer is to alter the apparent path to a station 14b so that it appears to be inaccessible to a stations 14a which should not be allowed access.

For example, returning attention to FIG. 1, station 14a initiates a network level communication with station 14b, which is observed by the access controller 16a. If the memory 166 and processor 164 in the access controller 16a indicate that some aspect of the attempted network level communication needs to be controlled, then the access controller 16a transmits an appropriate packet to station 14a to indicate that the particular destination station 14b is not reachable.

To accomplish this, the access controller 16a can examine one or more portions of the packet to determine if access is permissible, depending upon the type of control desired. Among the items it may examine is a pair of station address fields 20e, a network layer protocol type 20f, a socket type 20g or time of day field 20h. This list is not meant to be a complete list of all possible parameters, but rather is illustrative of the type of possible controls.

As an example of an implementation at the network layer, consider the protocol defined by the United States Government called Internet Protocol (IP), which is commonly used in many environments.

First, station 14a transmits an Internet Datagram message to station 14b, which is detected by the access controller 16a (e.g., step 120 of FIG. 2).

Next, the processor 164 in the access controller 16a sees the Internet Datagram and determines from its internal memory 166 that this particular communication is not authorized between station 14a and station 14b (step 130).

Finally, the access controller 16a sends an ICMP message to station 14a, indicating that station 14b is not reachable (step 160), causing station 14a to discontinue further transmissions to station 14b. While, in some instances, the transmitted Internet Datagram message may ultimately arrive at station 14b, the flow of communications will be disrupted between 14a and 14b, thereby making it an impractical means of communication.

Once the ICMP message has been received, station 14a will reset its network layer state tables, and assume that further attempts to transmit to station 14b will be of no value.

As another example of a network layer implementation of the invention, the OSI standard defines a network layer protocol called OSI/IP. The adaptation of the invention to OSI/IP is quite analogous to the IP implementation.

For example, assuming that station 14a is to be prevented from accessing station 14b, station 14a will first transmit an NPDU message to station 14b, which is detected by the access controller 16a. Next, the access controller 16a determines that this particular communication is not authorized, and it initiates an ER message to station 14a, thus indicating that station 14b is not reachable. The ER message, in turn, causes station 14a to discontinue transmissions to station 14b.

Transport Layer

As previously mentioned, the invention can also be implemented at layers such as the transport layer in the OSI model, which is responsible for maintaining connections and guaranteeing delivery of packets from station to station. The complexity of the network 10 between the two users 14 does not enter into the transport layer mechanism used to implement the invention. As such, the invention works equally well for transport layers implemented on local area networks, wide area networks or some combination of the two.

In general, the transport layer preserves state information as needed to allow each station 14 to make decisions about the integrity of its transmissions with other stations 14. The implementation of the invention at the transport layer preferably resets that state information to eliminate the connection from the transport layer database maintained by each station 14.

The general idea at the transport layer is that when a station 14a initiates an unauthorized transport level communication with station 14b, it is detected by the access controller 16a (e.g. step 120 of FIG. 2). Once the comparison of the transport level communication with those stored in the memory 166 indicates that communication needs to be controlled, then the access controller 16a transmits a message to either station 14a, station 14b, or both, to reset and disconnect the transport layer connection.

The access controller 16a can examine various portions of the transport layer packet to determine if it is of the unauthorized type. For example, and referring again to FIG. 1, among the fields it can examine are transport layer port number pairs 20j, protocol type 20k, socket type 20l, and time of day 20 m fields. Again, this list is not meant to be complete, but is rather as illustrative of the type of possible controls.

As a specific example, consider Transmission Control Protocol (TCP), which is a transport layer protocol defined by the United States Government in common use.

First, station 14a initiates a connection by sending a SYN message to station 14b. Next, the access controller 16a detects the SYN message (e.g., step 120 of FIG. 2) and then determines from its memory 166 that this particular connection is not authorized (step 130). Access controller 16a then sends an RST message to both station 14a and station 14b (step 160). The RST message, and all of the other protocol layers in the transmitted termination packet are disguised, so that the RST message sent to station 14a looks as though it originates at station 14b, and the RST message sent to station 14b looks as though it originates at station 14a.

Once the RST messages have been received, both stations 14a and 14b reset their internal transport layer state tables, and dismiss the embryonic connection between stations 14a and 14b.

The invention can be implemented similarly using the ISO standard protocol TP4. With this protocol, station 14a initiates a connection by sending a CR message to station 14b. The access controller 16a detects the CR message (step 120 of FIG. 2) and determines from its memory 166 that this particular connection is not authorized (step 130). The access controller then sends a DR message to stations 14a and 14b (step 160), preferably disguised as explained in the TCP example.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. An access controller for use in a communications network having a plurality of stations which vie for access to a shared physical medium, the access controller comprising:
    means for passively detecting packets transmitted on the medium;
    means for determining if a detected packet indicates that one of the stations is attempting an unauthorized access to another station; and
    means for originating an access termination signal on the medium if the means for determining determines that the detected packet indicates an unauthorized access, the access termination signal selectively terminating the particular unauthorized access while allowing other authorized accesses by the attempting station to continue.

2. An access controller as in claim 1 wherein the means for determining additionally examines a source station identification field in the detected packet.

3. An access controller as in claim 1 wherein the means for determining additionally examines a destination station identification field in the detected packet.

4. An access controller as in claim 1 wherein the means for determining additionally examines a protocol type identification field in the detected packet.

5. An access controller as in claim 1 wherein the means for originating an access termination signal additionally transmits an access controller identification signal on the medium.

6. An access controller as in claim 5 wherein said network includes another access controller connected to the physical medium, said another access controller includes means for transmitting an access termination signal, and wherein said access controller additionally comprises:
    means for shutting down the access controller for a predetermined period of time if an access controller identification signal transmitted by said another access controller is detected on the medium.

7. An access controller as in claim 6 wherein said access controller additionally comprises:
    means for transmitting a shutdown signal on the medium before shutting down the access controller.

8. An access controller as in claim 7 wherein said another access controller includes means for transmitting a shutdown signal on the medium before before shutting down the access controller, and wherein said access controller additionally comprises:
    means for shutting down the access controller for a predetermined period of time if a shutdown signal transmitted by said another access controller is detected on the medium.

9. An access controller as in claim 1 wherein the means for detecting packets detects data link layer packets.

10. An access controller as in claim 9 wherein the means for originating an access termination signal destroys the detected packet, if the means for determining determines that the detected packet indicates an unauthorized access.

11. An access controller as in claim 1 wherein the means for detecting packets detects network layer packets.

12. An access controller as in claim 11 wherein the means for originating an access termination signal transmits a connection termination packet to the station which was the source of the detected packet, the connection termination packet indicating that a destination station specified in the detected packet is not operable.

13. An access controller as in claim 1 wherein the means for detecting packets detects transport layer packets.

14. An access controller as in claim 13 wherein the means for originating an access termination sequence transmits a connection termination packet to both a destination station and a source station specified in the detected packet.

15. A network access controller comprising:
    an interface circuit, connected to transmit and detect data packets on a physical medium shared by a plurality of network stations;
    a memory, having stored therein data which represents a list of authorized network access types; and
    processor means, connected to the interface circuit and the memory, for receiving a detected packet from the interface circuit, and for comparing the detected packet with the list of authorized network protocol types, to determine whether the detected packet indicates an unauthorized access, and, if the detected packet indicates an unauthorized access, for causing the interface circuit to transmit an access termination signal on the physical medium, the access termination signal selectively terminating the unauthorized access while allowing other authorized accesses to be attempted.

16. An access controller as in claim 1 wherein the network uses a carrier sense multiple access with collision detection (CSMA/CD) physical layer and the access termination signal is a signal that causes a collision with the detected packet.

17. An access controller as in claim 1 wherein the network uses a token ring physical layer.

18. An access controller as in claim 1 additionally comprising:
means for detecting a station address indicated by a destination field in the detected packet, and
wherein the access termination signal transmitted by the access controller is a packet having a source address field set equal to the destination field in the detected packet, and a field indicating that the station specified by the destination field in the detected packet is not able to receive packets.

19. An access controller as in claim 1 additionally comprising:
means for detecting a station address indicated by a source field in the detected packet, and
wherein the access termination signal transmitted by the access controller is a packet having a source address field set equal to the source field in the detected packet.

20. An access controller for use in a communications network having a plurality of stations which vie for access to a shared physical medium, the access controller comprising:
means for passively detecting packets transmitted on the medium;
means for determining if a detected packet indicates that one of the stations is attempting an unauthorized access to another station; and
means for transmitting an access termination signal to a source station which originated the detected packet, if the means for determining determines that the detected packet indicates an unauthorized access, and the access termination signal indicating to the source station that a destination station specified in the detected packet is not operable.

21. An access controller for use in a peer-to-peer communications network having a plurality of stations which vie for access to a shared physical medium, the access controller comprising:
means for passively detecting packets transmitted on the network;
means for determining if a detected packet indicates that a communication between a first station and a second station is being attempted, and that the attempted communication is of a type which is unauthorized; and
means for originating a termination signal which causes the unauthorized communication between the first and second station to terminate, while allowing the first and second stations to continue other authorized communications with each other, and allowing each of the first and second stations to continue other authorized communications with other stations.

22. A method for controlling access to a communications network in which a plurality of stations vie for access to a shared physical medium, the method comprising the steps of:
detecting packets transmitted on the medium;
determining if information in a detected packet indicates that one of the stations is attempting an unauthorized access to another station; and
if the detected packet indicates an unauthorized access, transmitting an access termination signal on the medium which selectively terminates the particular unauthorized access while allowing other authorized accesses by the attempting station to continue.

23. A method as in claim 22 wherein the step of determining if one of the stations is attempting an unauthorized access additionally comprises the step of:
examining a source station identification field in the detected packet.

24. A method as in claim 22 wherein the step of determining if one of the stations is attempting an unauthorized access additionally comprises the step of:
examining a destination station identification field in the detected packet.

25. A method as in claim 22 wherein the step of determining if one of the stations is attempting an unauthorized access additionally comprises the step of:
comparing a protocol type identification field in the detected packet to a list of authorized protocol types.

26. A method as in claim 22 wherein the step of transmitting an access termination signal additionally comprises:
transmitting an access controller identification signal on the medium.

27. A method as in claim 26 wherein the network includes another access controller which transmits identification signals on the physical medium, and the method additionally comprises the steps of:
waiting a predetermined period of time if an access controller identification signal transmitted by said another access controller is detected on the medium.

28. An access controller as in claim 27 additionally comprising the step of:
transmitting a shutdown signal on the medium before waiting a predetermined period of time.

29. A method as in claim 28 additionally comprising the step of:
waiting for a predetermined period of time if the step of detecting packets detects a shutdown signal transmitted on the medium by said another access controller.

30. A method as in claim 22 wherein the step of transmitting an access termination signal includes the step of destroying the detected packet.

31. A method as in claim 22 wherein the step of transmitting an access termination signal includes the step of transmitting a connection termination packet to the station which originated the unauthorized access.

32. A method as in claim 22 wherein the detected packet includes a source address field and a destination address field, and the step of transmitting an access termination signal includes the steps of
transmitting a connection termination packet to a station indicated by the source address field; and
transmitting a connection termination packet to a station indicated by the destination address field.

33. A method as in claim 22 wherein the network uses a carrier sense multiple access with collision detection (CSMA/CD) physical layer and the step of transmitting an access termination signal includes the step of causing a collision with the detected packet.

34. A method as in claim 22 wherein the network uses a token ring data link layer.

35. A method as in claim 22 additionally comprising the steps of:
determining a station address indicated by a source field in the detected packet; and wherein the step of transmitting an access termination signal includes the step of transmitting a packet having a destination address field set equal to the source field in the detected packet.

36. A method as in claim 22 additionally comprising the steps of:
determining a station address indicated by a destination field in the detected packet, and
wherein the step of transmitting an access termination signal includes the step of transmitting a packet having a source address field set equal to the destination field in the detected packet, and a field indicating that the attempted access should be terminated.

37. A method as in claim 22 additionally comprising the steps of:
determining a station address indicated by a source field in the detected packet, and
wherein the step of transmitting an access termination signal includes the step of transmitting a packet having a destination address field set equal to the source field in the detected packet, and a field indicating that the attempted access should be terminated.

38. A method for controlling access to a communications network having a plurality of stations which vie for access to a shared physical medium, the method comprising the steps of:
passively detecting packets transmitted on the medium;
determining if a detected packet indicates that one of the stations is attempting an access to another station which is unauthorized; and
if the detected packet indicates an unauthorized access, transmitting an access termination signal over the medium to a source station which originated the unauthorized access, the access termination signal indicating to the source station that a destination station specified in the detected packet is not operable.

39. A method for controlling access to a peer-to-peer communications network which includes a plurality of station that vie for access to a shared medium, the method comprising the steps of:
passively detecting packets transmitted on the shared medium;
determining if a detected packet indicates that a communication between a first station and a second station is being attempted, and that the attempted communication is of a type which is unauthorized; and
originating a termination signal on the medium which causes the unauthorized communication between the first and second station to terminate, while allowing the first and second stations to continue other authorized communications with each other, and allowing each of the first and second stations to continue other authorized communications with other stations.

40. A method for preventing unauthorized accesses to a communication medium shared by a plurality of network stations which communicate by exchanging data packets, the steps of the method performed by an access controller station which masquerades as one of the stations indicated as a destination address in an unauthorized access, the method comprising the steps of:
detecting information which indicates the type of data packet presently being communicated on the medium;
comparing the detected data protocol type to a list of authorized data protocol types, to determine if the protocol type presently being communicated on the medium is unauthorized; and
transmitting a reply packet on the medium, the reply packet appearing as a legitimate response by an intended destination station indicated by the detected packet, while terminating the unauthorized access and allowing other authorized accesses to continue.

41. A method for preventing a selected attempted communication by a first station with a second station within a network of stations connected by a physical medium, where the communication is being attempted in accordance with a packet-type communication protocol which provides a mechanism for effecting termination of the communication, said method comprising the steps of:
detecting the presence on the medium of a packet representing said selected attempted communication; and
preventing said selected attempted communication by said first station by originating on said physical medium an access prevention signal in accordance with said communication terminating mechanism, while allowing other communications by said first station to continue.

* * * * *